United States Patent
Crivella et al.

(10) Patent No.: US 10,671,047 B2
(45) Date of Patent: Jun. 2, 2020

(54) COMPOSITE STRUCTURE REPAIR SYSTEM AND METHOD

(71) Applicant: The Boeing Company, Chicago, IL (US)

(72) Inventors: Michelle Crivella, Charleston, SC (US); Christopher L. Brooks, Jr., Mt. Pleasant, SC (US)

(73) Assignee: The Boeing Company, Chicago, IL (US)

( * ) Notice: Subject to any disclaimer, the term of this patent is extended or adjusted under 35 U.S.C. 154(b) by 259 days.

(21) Appl. No.: 15/922,260

(22) Filed: Mar. 15, 2018

(65) Prior Publication Data

US 2019/0286095 A1  Sep. 19, 2019

(51) Int. Cl.
*G05B 19/402* (2006.01)
*B64F 5/40* (2017.01)
(Continued)

(52) U.S. Cl.
CPC .......... *G05B 19/402* (2013.01); *B23B 35/00* (2013.01); *B29C 70/545* (2013.01); *B29C 73/10* (2013.01);
(Continued)

(58) Field of Classification Search
CPC .............. G05B 19/402; G05B 19/401; G05B 2219/45059; G05B 2219/39156;
(Continued)

(56) References Cited

U.S. PATENT DOCUMENTS

| 5,016,199 A * | 5/1991 | McMurtry | G01B 7/008 33/503 |
| 6,256,546 B1 * | 7/2001 | Graham | G05B 19/4099 700/29 |

(Continued)

FOREIGN PATENT DOCUMENTS

GB  2540014 A  4/2017

OTHER PUBLICATIONS

Abbas, Adel et al. Optimum drilling path planning for a rectangular matrix of holes using ant colony optimization. International Journal of Production Research, vol. 49, Issue 19, Oct. 1, 2011, pp. 5877-5891 [online], [retrieved on Jan. 15, 2019]. Retrieved from the Internet (Year: 2011).*

(Continued)

*Primary Examiner* — Kenneth M Lo
*Assistant Examiner* — Mohammed Shafayet
(74) *Attorney, Agent, or Firm* — Yee & Associates, P.C.

(57) ABSTRACT

A method and system for drilling holes in a repaired composite structure. Four corner holes are selected from holes outside of a repaired area in the repaired composite structure. The four corner holes define a rectangle encompassing the repaired area with sides that each include a pair of corner holes with intermediate holes in between. A surface representation is generated based on a scan of the repaired composite structure that includes the rectangle. Side hole locations between a corresponding pair of corner holes are generated for each side of the rectangle. Grid vector lines are generated between corresponding pairs of side hole locations on opposite sides of the rectangle. The grid vector lines intersect each other at intersection points on the surface representation. Point coordinates are determined for intersection points that lie within the repaired area. A path is (Continued)

created for drilling holes at point coordinates for the intersection points.

20 Claims, 15 Drawing Sheets

(51) Int. Cl.
    *B29C 70/54*     (2006.01)
    *G05B 19/401*     (2006.01)
    *B23B 35/00*     (2006.01)
    *B29C 73/10*     (2006.01)
    *F01N 13/18*     (2010.01)
    *F01D 5/00*     (2006.01)
    *F01N 13/08*     (2010.01)
    *B29C 73/26*     (2006.01)
    *F02C 7/045*     (2006.01)

(52) U.S. Cl.
    CPC ............... *B29C 73/26* (2013.01); *B64F 5/40* (2017.01); *F01D 5/005* (2013.01); *F01N 13/08* (2013.01); *F01N 13/18* (2013.01); *F02C 7/045* (2013.01); *G05B 19/401* (2013.01); *B23B 2226/27* (2013.01); *F01N 2450/00* (2013.01); *F05D 2300/603* (2013.01); *G05B 2219/45059* (2013.01)

(58) Field of Classification Search
    CPC ........... G05B 2219/36201; G05B 2219/37199; B29C 70/545; B29C 73/10; B29C 73/26; F01N 13/08; F01N 13/18; F01N 2450/00; B23B 35/00; B23B 2226/27; F01D 5/005; F02C 7/045; B64F 5/40; F05D 2300/603; B25J 9/1682
    USPC ........................................................ 700/160
    See application file for complete search history.

(56) References Cited

U.S. PATENT DOCUMENTS

| | | | |
|---|---|---|---|
| 8,218,852 B2 | 7/2012 | Cork et al. | |
| 2004/0034444 A1* | 2/2004 | Graham | G05B 19/40931 700/186 |
| 2009/0144980 A1* | 6/2009 | Rangarajan | B23P 6/007 29/889.1 |
| 2010/0126971 A1* | 5/2010 | Calder | B23K 15/0006 219/121.18 |
| 2011/0177285 A1* | 7/2011 | Bogue | B29C 73/06 428/117 |
| 2012/0301702 A1* | 11/2012 | Nishimura | B29C 73/04 428/223 |
| 2012/0304433 A1* | 12/2012 | Roux | B29C 73/04 29/402.09 |
| 2013/0292202 A1* | 11/2013 | Moutier | B29C 73/04 181/292 |
| 2014/0257543 A1* | 9/2014 | Rhodes | G05B 19/4097 700/97 |
| 2014/0329043 A1* | 11/2014 | Shigetomi | F02C 7/045 428/63 |
| 2015/0090392 A1 | 4/2015 | Bertrand et al. | |
| 2015/0267593 A1* | 9/2015 | Lauder | B23B 39/20 181/214 |
| 2016/0187867 A1* | 6/2016 | Hasty | G05B 19/401 700/192 |
| 2016/0291570 A1* | 10/2016 | Iriguchi | B23C 3/24 |
| 2018/0029725 A1* | 2/2018 | Batzakis | B64F 5/40 |
| 2019/0345771 A1* | 11/2019 | Zalluhoglu | E21B 41/0092 |

OTHER PUBLICATIONS

Abbas, Adel et al. A general algorithm for drilling holes lying in a matrix. Robotics and Computer-Integrated Manufacturing, vol. 21, Issue 3, 2005, pp. 235-239, ISSN 0736-5845 [online], [retrieved on Jan. 15, 2019]. Retrieved from the internet (Year: 2005).*

Extended European Patent Search Report dated Aug. 9, 2019, regarding Application No. 19162583.9, 5 pages.

* cited by examiner

COMPOSITE STRUCTURE REPAIR SYSTEM AND METHOD

BACKGROUND INFORMATION

1. Field

The present disclosure relates generally to aircraft and, in particular, to a method, an apparatus, and a system for repairing composite structures in an aircraft. Still more particularly, the present disclosure relates to a method, an apparatus, and a system for re-creating hole patterns in a repaired area of a composite structure of an aircraft.

2. Background

Aircraft are being designed and manufactured with greater and greater percentages of composite materials. Composite materials are used in aircraft to decrease the weight of the aircraft. This decreased weight improves performance features such as payload capacities and fuel efficiencies. Further, composite materials provide longer service life for various components in an aircraft.

Composite materials are tough, light-weight materials created by combining two or more functional components. For example, a composite material may include reinforcing fibers bound in a polymer resin matrix. The fibers may be unidirectional or may take the form of a woven cloth or fabric. The fibers and resins are arranged and cured to form a composite material.

For example, the inlet of an engine for an aircraft may be formed from composite materials. This type of inlet includes acoustic liners which trap soundwaves and reduce engine noise. These acoustic liners are located in a barrel portion of the inlet and may include holes or perforations drilled in a face sheet or other layer in the barrel.

From time to time, an inconsistency may occur in the inlet resulting in rework being performed on the inlet. This rework may involve removing an area of the inlet containing the inconsistency and placing a composite repair patch in that area.

When the rework on the inlet includes the acoustic liner in the barrel portion of the inlet, the composite repair patch on that portion of the inlet does not include a hole pattern used to provide the acoustic properties for the acoustic liner. As a result, re-creation of the hole pattern is needed to maintain the acoustic properties of the aircraft inlet.

Currently, the hole pattern is re-created by human operators drilling the holes by hand to restore the hole pattern. This type of rework is tedious and extremely challenging to meet requirements for the hole pattern to maintain the acoustic properties desired for the inlet. As a result, often times, the barrel is scrapped and replaced with a new barrel containing the desired hole pattern.

Therefore, it would be desirable to have a method and apparatus that take into account at least some of the issues discussed above, as well as other possible issues. For example, it would be desirable to have a method and apparatus that overcome a technical problem with re-creating a hole pattern in a composite part such as an acoustic liner for an inlet of an aircraft engine.

SUMMARY

An embodiment of the present disclosure provides a method for drilling holes in a repaired composite structure. Four corner holes are selected from a plurality of existing holes outside of a repaired area in the repaired composite structure, wherein the four corner holes define a rectangle that encompasses the repaired area and at least a few rows of the plurality of existing holes outside of the repaired area, and wherein each side on opposite sides of the rectangle includes a pair of corner holes with a same number of intermediate holes between the pair of corner holes. A surface representation of the repaired composite structure is generated based on a scan of a surface of the repaired composite structure that includes the rectangle that has the four corner holes, wherein the scan is obtained from a three-dimensional scanner. A series of side hole locations between a corresponding pair of corner holes are generated for each side of the rectangle, wherein side hole locations in the series of side hole locations are equidistant to each other. Grid vector lines extending between corresponding pairs of the side hole locations on the opposite sides of the rectangle are generated, wherein the grid vector lines approximate a curvature of the surface of the repaired composite structure and intersect each other at intersection points on the surface representation to form a grid. Point coordinates are determined for each of the intersection points of the grid vector lines that lie within the repaired area. A tool path is created for a number of robotic devices to drill new holes at the point coordinates for each of the intersection points that lie within the repaired area at which an existing hole is not present, enabling the number of robotic devices to drill the new holes in the repaired area with a hole pattern that matches an existing hole pattern for the plurality of existing holes in the repaired composite structure.

Another embodiment of the present disclosure provides a composite structure repair system comprising a computer system and a repair manager running on the computer system. The repair manager selects four corner holes from a plurality of existing holes outside of a repaired area in a repaired composite structure, wherein the four corner holes define a rectangle that encompasses the repaired area and at least a few rows of the plurality of existing holes outside of the repaired area. Each side on opposite sides of the rectangle includes a pair of corner holes with a same number of intermediate holes between the pair of corner holes. The repair manager generates a surface representation of the repaired composite structure based on a scan of a surface of the repaired composite structure that includes the rectangle that has the four corner holes, wherein the scan is obtained from a three-dimensional scanner. For each side of the rectangle, the repair system generates a series of side hole locations between a corresponding pair of corner holes, wherein side hole locations in the series of side hole locations are equidistant to each other. The repair system generates grid vector lines extending between corresponding pairs of the side hole locations on opposite sides of the rectangle, wherein the grid vector lines approximate a curvature of the surface of the repaired composite structure and intersect each other at intersection points on the surface representation to form a grid. The repair system determines point coordinates for each of the intersection points of the grid vector lines that lie within the repaired area. The repair system creates a tool path for a number of robotic devices to drill new holes at the point coordinates for each of the intersection points that lie within the repaired area at which an existing hole is not present, enabling the number of robotic devices to drill the new holes in the repaired area with a hole pattern that matches an existing hole pattern for the plurality of existing holes in the repaired composite structure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that one solution for recreating a hole pattern involves using the original robotic device and computer numerical control file used to form the holes when the barrel was manufactured. The illustrative embodiments recognize and take into account, however, that, often times, the original robotic device, platform, or both used in the original manufacturing are unavailable in a repair environment.

Thus, the illustrative embodiments provide a method, an apparatus, and a system for drilling holes in a repaired composite structure. In one illustrative example, four corner holes are selected from a plurality of existing holes outside of a repaired area in the repaired composite structure. The four corner holes define a rectangle. This rectangle encompasses the repaired area and at least a few rows of the plurality of existing holes outside of the repaired area. Each side of the rectangle on opposite sides of the rectangle includes a pair of corner holes.

A surface representation of the repaired composite structure is generated based on a scan of the surface of the repaired composite structure that includes the rectangle that has the four corner holes, wherein the scan is obtained from a three-dimensional scanner. A series of side hole locations is generated between a corresponding pair of corner holes for each side of the rectangle. The side hole locations in the series are equidistant to each other, and each side on the opposite sides of the rectangle have a same number of side hole locations. Grid vector lines are generated that extend between corresponding pairs of the side hole locations on opposite sides of the rectangle. The grid vector lines approximate a curvature of the surface of the repaired composite structure and intersect each other at intersection points on the surface representation to form a grid. Point coordinates are determined for each of the intersection points of the grid vector lines that lie within the repaired area. A tool path is created for a number of robotic devices to drill new holes at the point coordinates for each of the intersection points that lie within the repaired area at which an existing hole is not present. As a result, the number of robotic devices is enabled to drill the new holes in the repaired area with a hole pattern that matches an existing hole pattern for the plurality of existing holes in the repaired composite structure.

As used herein, "a number of," when used with reference items, means one or more items. For example, "a number of robotic devices" is one or more robotic devices.

Figure 1:
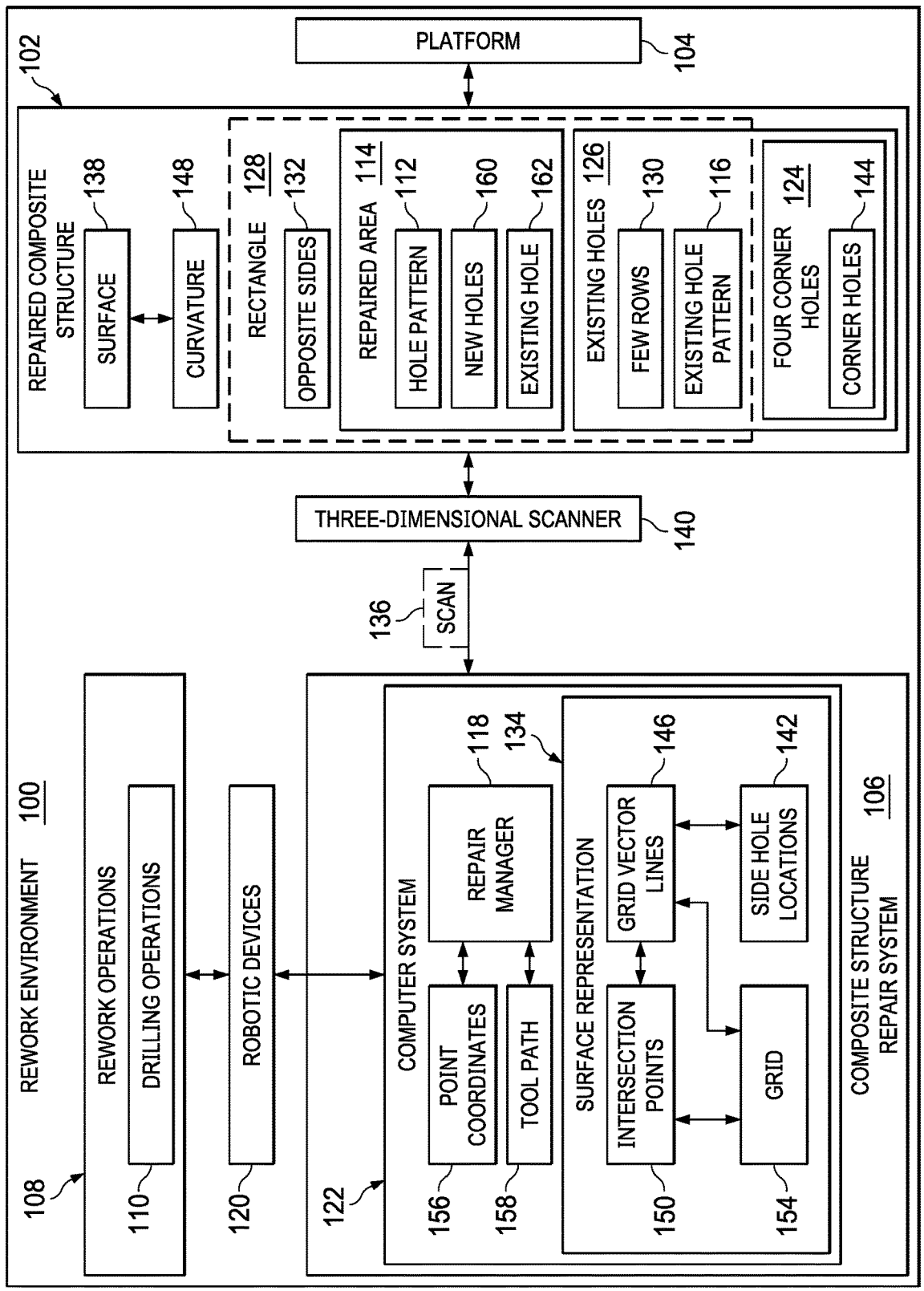
FIG. 1 is an illustration of a block diagram of a rework environment in accordance with an illustrative embodiment.

With reference now to the figures and, in particular, with reference to FIG. 1, an illustration of a block diagram of a rework environment is depicted in accordance with an illustrative embodiment. As depicted, rework environment 100 is an environment in which repaired composite structure 102 in platform 104 can be reworked in accordance with an illustrative example.

As depicted, repaired composite structure 102 can take a number of different forms. For example, without limitation, repaired composite structure 102 can be selected from a group comprising an aircraft engine inlet, a composite sandwich, an acoustic composite structure, and other suitable types of structures.

In this illustrative example, platform 104 can take a number of different forms. For example, platform 104 can be selected from one of a mobile platform, a stationary platform, a land-based structure, an aquatic-based structure, a space-based structure, an aircraft, a commercial aircraft, a rotorcraft, a surface ship, a tank, a personnel carrier, a train, a spacecraft, a space station, a satellite, a submarine, an automobile, a power plant, a bridge, a dam, a house, a manufacturing facility, a building, and other suitable types of platforms.

As depicted, composite structure repair system 106 operates to perform rework operations 108 on repaired composite structure 102. Rework operations 108 can include at least one of drilling, inspection, sealing, fastener installation, or other suitable types of operations that may be performed on repaired composite structure 102.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, composite structure repair system 106 operates to perform drilling operations 110 in rework operations 108 for repaired composite structure 102 such that hole pattern 112 in repaired area 114 substantially matches existing hole pattern 116 in repaired composite structure 102 outside of repaired area 114.

In one illustrative example, composite structure repair system 106 comprises repair manager 118 and robotic devices 120. In this illustrative example, repair manager 118 runs on computer system 122. Computer system 122 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

As depicted, robotic devices 120 are configured to perform rework operations 108. A robotic device in robotic devices 120 is a physical machine that is configured to perform operations under the control of a processor unit. The robotic device may perform operations using a program that defines the operations to be performed. Robotic devices 120 can be selected from at least one of a robotic arm, a crawler, a drone, a six-axis robot, a computer numerical control robot, a robotic lathe, or some other suitable type of robotic device.

In one illustrative example, repair manager 118, running on computer system 122, selects four corner holes 124 from a plurality of existing holes 126 outside of repaired area 114 in repaired composite structure 102. As depicted, four corner holes 124 define rectangle 128 that encompasses repaired area 114 and at least few rows 130 of the plurality of existing holes 126 outside of repaired area 114. Each side of rectangle 128 on opposite sides 132 of rectangle 128 includes a pair of corner holes 144. When all of the sides of rectangle 128 are the same length, rectangle 128 can be referred to as a square.

Repair manager 118 generates surface representation 134 of repaired composite structure 102 based on scan 136 of surface 138 of repaired composite structure 102 that includes rectangle 128 that has four corner holes 124. In the depicted example, scan 136 is obtained from three-dimensional scanner 140.

In this illustrative example, three-dimensional scanner 140 is a hardware device that analyzes a real-world object or environment to collect data on the shape of the object or environment in three dimensions. Three-dimensional scanner 140 can also measure information such as the appearance of the object. This appearance may include, for example, color. In this illustrative example, scan 136 can be, for example, a cloud, a polygon mesh, or some other suitable type of information describing the shape of the object in three dimensions.

Three-dimensional scanner 140 can take a number of different forms. For example, three-dimensional scanner 140 may be a laser scanner, a structured light three-dimensional scanner, an industrial computer tomography scanner, or some other suitable type of scanning device.

Repair manager 118 generates, for each side of rectangle 128, a series of side hole locations 142 between corresponding pairs of corner holes 144 in four corner holes 124. In this depicted example, side hole locations 142 are generated on surface representation 134. As depicted, the series of side hole locations 142 are equidistant to each other. Further, each side on opposite sides 132 of rectangle 128 have the same number of side hole locations 142. The series of side hole locations 142 are spaced apart from each other with a first distance that is substantially equal to a second distance between two adjacent existing holes in the plurality of existing holes 126 for existing hole pattern 116 in repaired composite structure 102.

Repair manager 118 generates grid vector lines 146 extending between corresponding pairs of side hole locations 142 on opposite sides 132 of rectangle 128 on surface representation 134. In the illustrative example, grid vector lines 146 approximate curvature 148 of surface 138 of repaired composite structure 102 and intersect each other at intersection points 150 on surface representation 134 to form grid 154.

As depicted, repair manager 118 determines point coordinates 156 for each of intersection points 150 of grid vector lines 146 that lie within repaired area 114. Further, repair manager 118 creates tool path 158 for a number of robotic devices 120 to drill new holes 160 at point coordinates 156 for each of intersection points 150 that lie within repaired area 114 at which existing hole 162 is not present. This example enables the number of robotic devices 120 to drill new holes 160 in repaired area 114 with hole pattern 112 that matches existing hole pattern 116 for the plurality of existing holes 126 in repaired composite structure 102.

Repair manager 118 may be implemented in software, hardware, firmware, or a combination thereof. When software is used, the operations performed by repair manager 118 may be implemented in program code configured to run on hardware, such as a processor unit. When firmware is used, the operations performed by repair manager 118 may be implemented in program code and data and stored in persistent memory to run on a processor unit. When hardware is employed, the hardware may include circuits that operate to perform the operations in repair manager 118.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Figure 2:
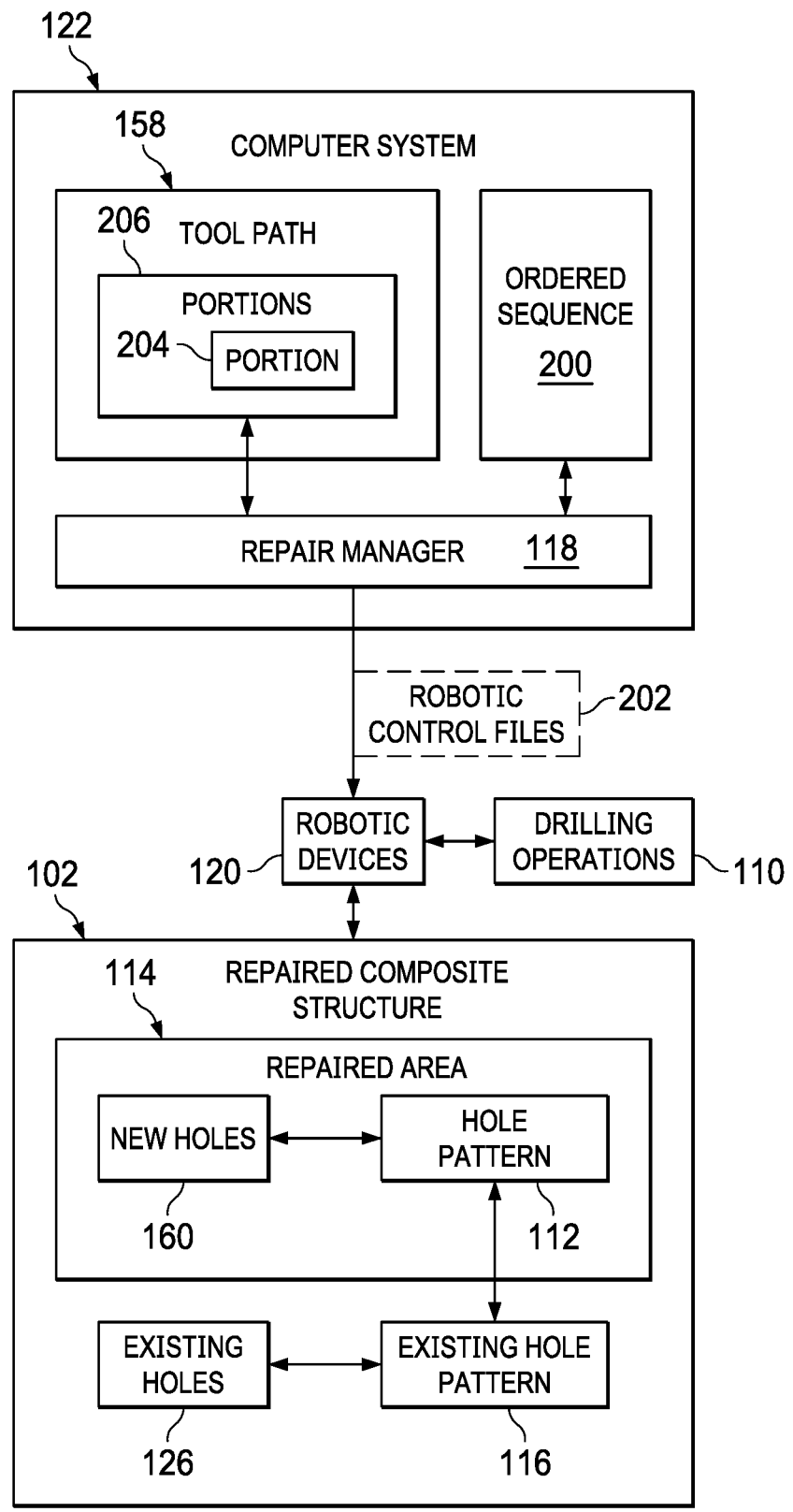
FIG. 2 is an illustration of a block diagram of a dataflow for controlling robotic devices to perform drilling operations on a repaired area in a repaired composite structure in accordance with an illustrative embodiment.

With reference now to FIG. 2, an illustration of a block diagram of a dataflow for controlling robotic devices to perform drilling operations on a repaired area in a repaired composite structure is depicted in accordance with an illustrative embodiment. In the illustrative examples, the same reference numeral may be used in more than one figure. This reuse of a reference numeral in different figures represents the same element in the different figures.

In creating tool path 158, repair manager 118 determines ordered sequence 200 for drilling new holes 160 at point coordinates 156 in FIG. 1. In this example, point coordinates 156 are from intersection points 150 in FIG. 1 that lie within repaired area 114 at which an existing hole is not present.

Repair manager 118 determines tool path 158 for the number of robotic devices 120 to drill new holes 160 in repaired area 114 using ordered sequence 200. In this illustrative example, ordered sequence 200 can be optimized to reduce the time needed to drill new holes 160 by taking into account a number of different considerations. For example, a shortest path, a least number of positioning stations for robotic devices 120, or some other metric for measuring performance in the machining of new holes 160 in repaired area 114 may be taken into account in identifying and optimizing ordered sequence 200.

With tool path 158, repair manager 118 creates a number of robotic control files 202 for the number of robotic devices 120 using tool path 158. A robotic control file in the number of robotic control files 202 comprises instructions to perform operations. For example, the robotic control file can be a program such as a numeric control file, and the robotic device can be a computer numerical control (CNC) machine.

In this illustrative example, a robotic control file is created for each robotic device in the number of robotic devices 120. If more than one robotic device is present, the robotic control file for each of robotic devices 120 defines drilling operations 110 to be performed on portion 204 of tool path 158. In other words, tool path 158 may be divided up into portions 206 that are assigned to robotic devices 120. A robotic device in the number of robotic devices 120 performs drilling operations 110 on portion 204 of tool path 158 assigned to the robotic device in the robotic control file in the number of robotic control files 202 for the robotic device.

In this particular example, repair manager 118 sends the number of robotic control files 202 to the number of robotic devices 120. The number of robotic devices 120 runs the number of robotic control files 202 for performing drilling operations 110 to form new holes 160 in ordered sequence 200 using tool path 158. The number of robotic devices 120 drill new holes 160 using the number of robotic control files 202.

Thus, composite structure repair system 106 enables drilling new holes 160 with hole pattern 112 that matches existing hole pattern 116 for existing holes 126 outside of repaired area 114. When the holes in repaired composite structure 102 provide acoustic properties, the matching of hole pattern 112 in repaired area 114 with existing hole pattern 116 outside of repaired area 114 provides an ability to maintain the acoustic properties in repaired composite structure 102. Composite structure repair system 106 with repair manager 118 enables reworking of composite structures, such as repaired composite structure 102, in less time and effort, thus making rework possible in place of replacing composite structures. As a result, replacing repaired composite structure 102 may be avoided, therefore reducing the cost of maintaining platform 104.

In one illustrative example, one or more technical solutions are present that overcome a technical problem with re-creating a hole pattern in a composite part, such as an acoustic liner for an inlet of an aircraft engine. As a result, one or more technical solutions may provide a technical effect of reducing the time and cost for reworking composite structures through an improved system for creating a hole pattern in a repaired area that matches the existing hole pattern in the other portions of the composite structure.

As a result, computer system 122 operates as a special purpose computer system in which repair manager 118 in computer system 122 enables performing drilling operations 110 in a manner that re-creates existing hole pattern 116 in repaired area 114 on repaired composite structure 102. In particular, repair manager 118 transforms computer system 122 into a special purpose computer system as compared to currently available general computer systems that do not have repair manager 118.

The illustration of rework environment 100 and the different components in rework environment 100 in FIG. 1 and FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, three-dimensional scanner 140 may be considered part of composite structure repair system 106 in some illustrative examples. Further, rework operations 108 may be performed during the manufacturing of composite structures in addition to maintenance after the composite structures are in use in a platform such as an aircraft.

Figure 3:
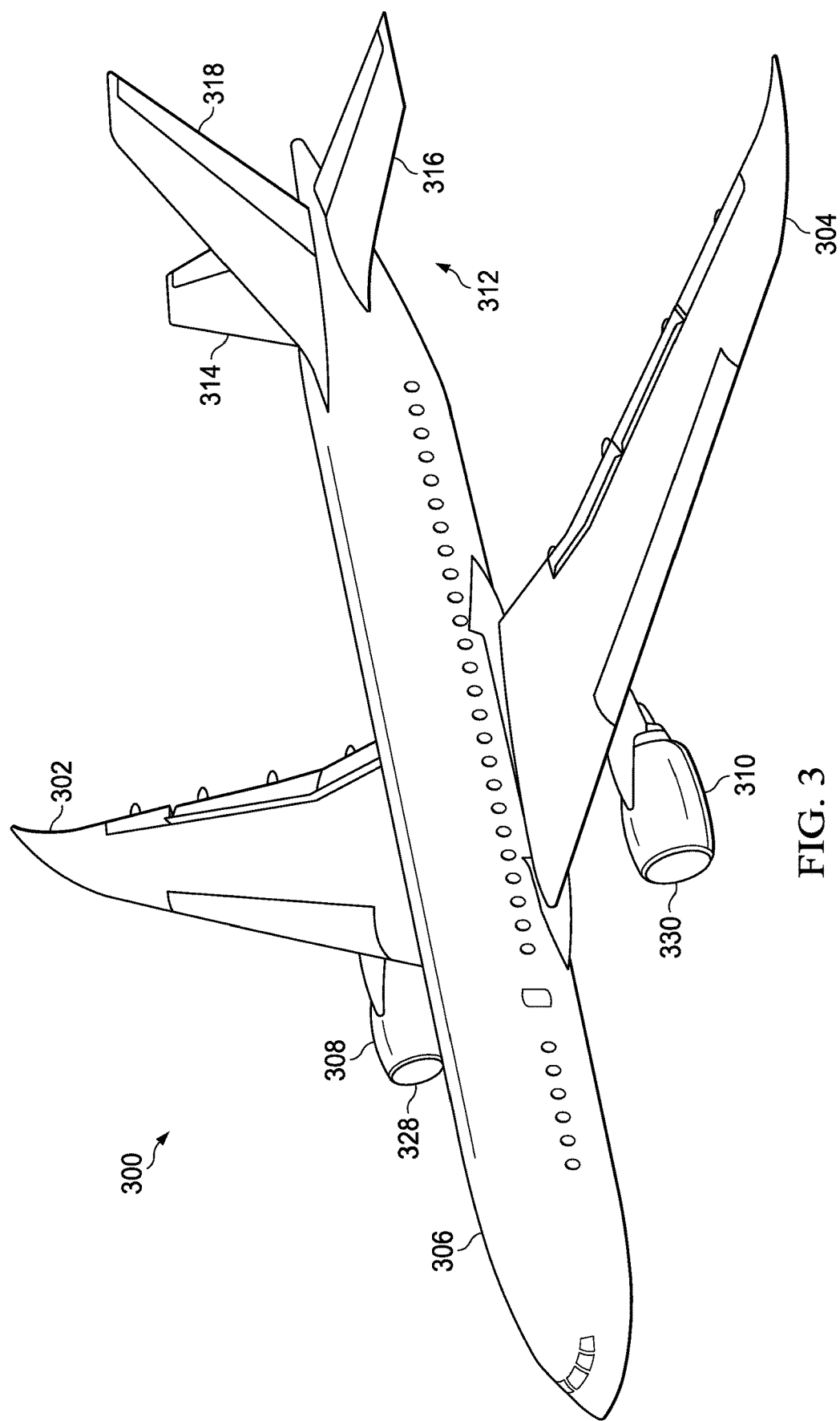
FIG. 3 is an illustration of an aircraft in accordance with an illustrative embodiment.

With reference next to FIG. 3, an illustration of an aircraft is depicted in accordance with an illustrative embodiment. In this illustrative example, aircraft 300 has wing 302 and wing 304 attached to body 306. Aircraft 300 includes aircraft engine 308 attached to wing 302 and aircraft engine 310 attached to wing 304.

Body 306 has tail section 312. Horizontal stabilizer 314, horizontal stabilizer 316, and vertical stabilizer 318 are attached to tail section 312 of body 306.

Aircraft 300 is an example of an aircraft having repaired composite structures, such as repaired composite structure 102 in FIG. 1, implemented in accordance with an illustrative embodiment. Composite structure repair system 106 in FIG. 1 can operate to perform rework operations on different parts of aircraft 300. For example, composite structure repair system 106 can operate for drilling operations on repaired areas of inlet 328 of aircraft engine 308 and inlet 330 of aircraft engine 310.

Figure 4:
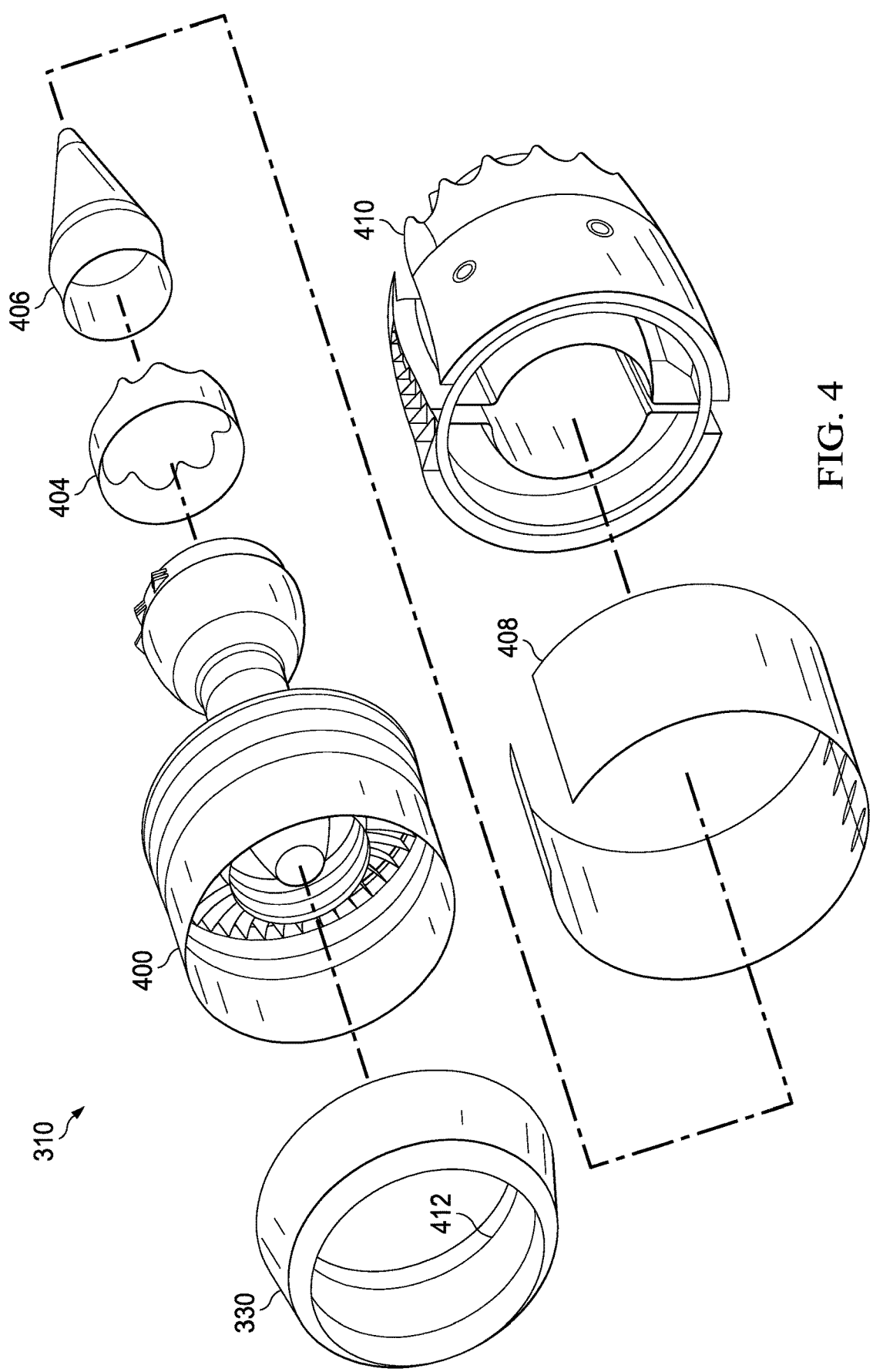
FIG. 4 is an illustration of an exploded view of an aircraft engine in accordance with an illustrative embodiment.

With reference now to FIG. 4, an illustration of an exploded view of an aircraft engine is depicted in accordance with an illustrative embodiment. In this illustrative example, an exploded view of aircraft engine 310 is shown.

Aircraft engine 310 includes inlet 330, engine 400, nozzle 404, plug 406, engine cowl 408, and fan duct and thrust receiver 410.

In this illustrative example, inlet 330 has acoustic inner barrel 412. In this illustrative example, acoustic inner barrel 412 includes an acoustic liner having holes that provide the desired acoustic properties. In this illustrative example, the desired acoustic properties include reducing noise from aircraft engine 310.

Figure 5:
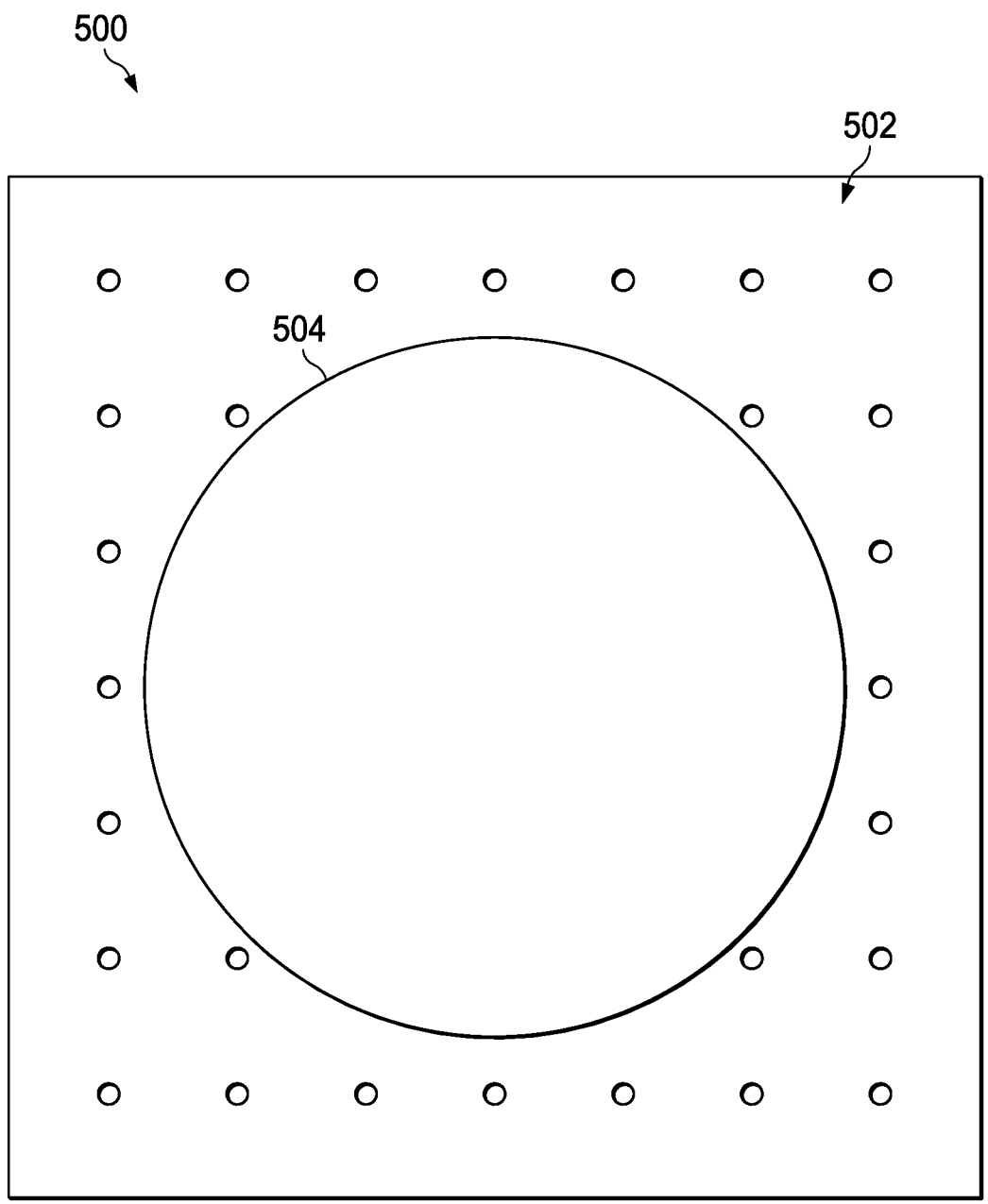
FIG. 5 is an illustration of a portion of an acoustic liner in accordance with an illustrative embodiment.

With reference next to FIG. 5, an illustration of a portion of an acoustic liner is depicted in accordance with an illustrative embodiment. In this illustrative example, a portion of acoustic liner 500 is shown. Acoustic liner 500 is an example of one implementation for repaired composite structure 102 in FIG. 1 and FIG. 2. Acoustic liner 500 can be used within acoustic inner barrel 412 in FIG. 4 to provide desired acoustic properties.

As depicted, existing holes 502 are present in acoustic liner 500. As depicted, acoustic liner 500 includes repaired area 504 in which holes are not present. New holes can be drilled in repaired area 504 having a hole pattern that matches the existing hole pattern of existing holes 502. This process can be performed using composite structure repair system 106 in FIG. 1.

Figure 6:
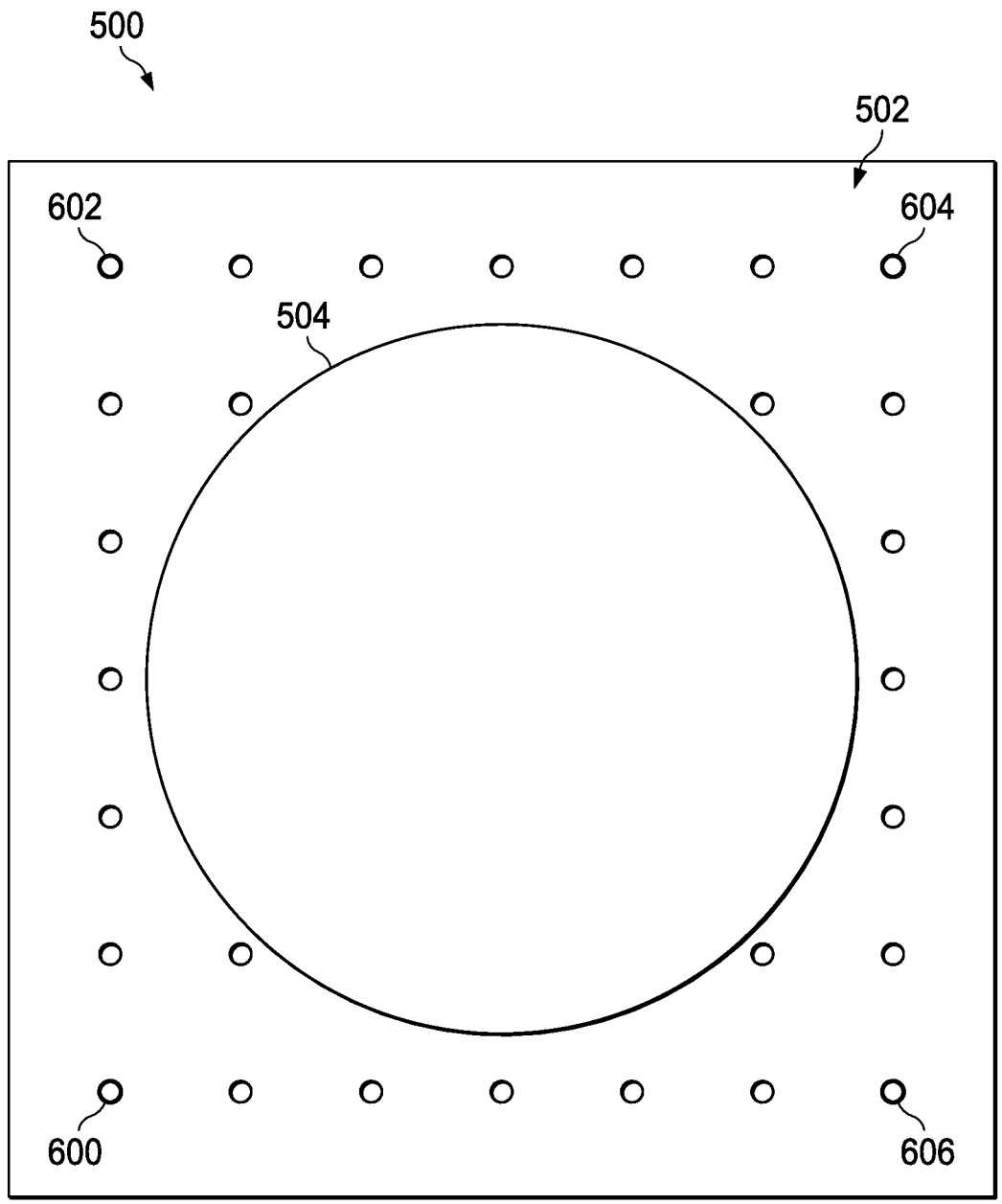
FIG. 6 is an illustration of corner holes in an acoustic liner in accordance with an illustrative embodiment.

With reference now to FIG. 6, an illustration of corner holes in an acoustic liner is depicted in accordance with an illustrative embodiment. In this figure, four corner holes, corner hole 600, corner hole 602, corner hole 604, and corner hole 606 are selected. These corner holes define a rectangle which encompasses repaired area 504.

Figure 7:
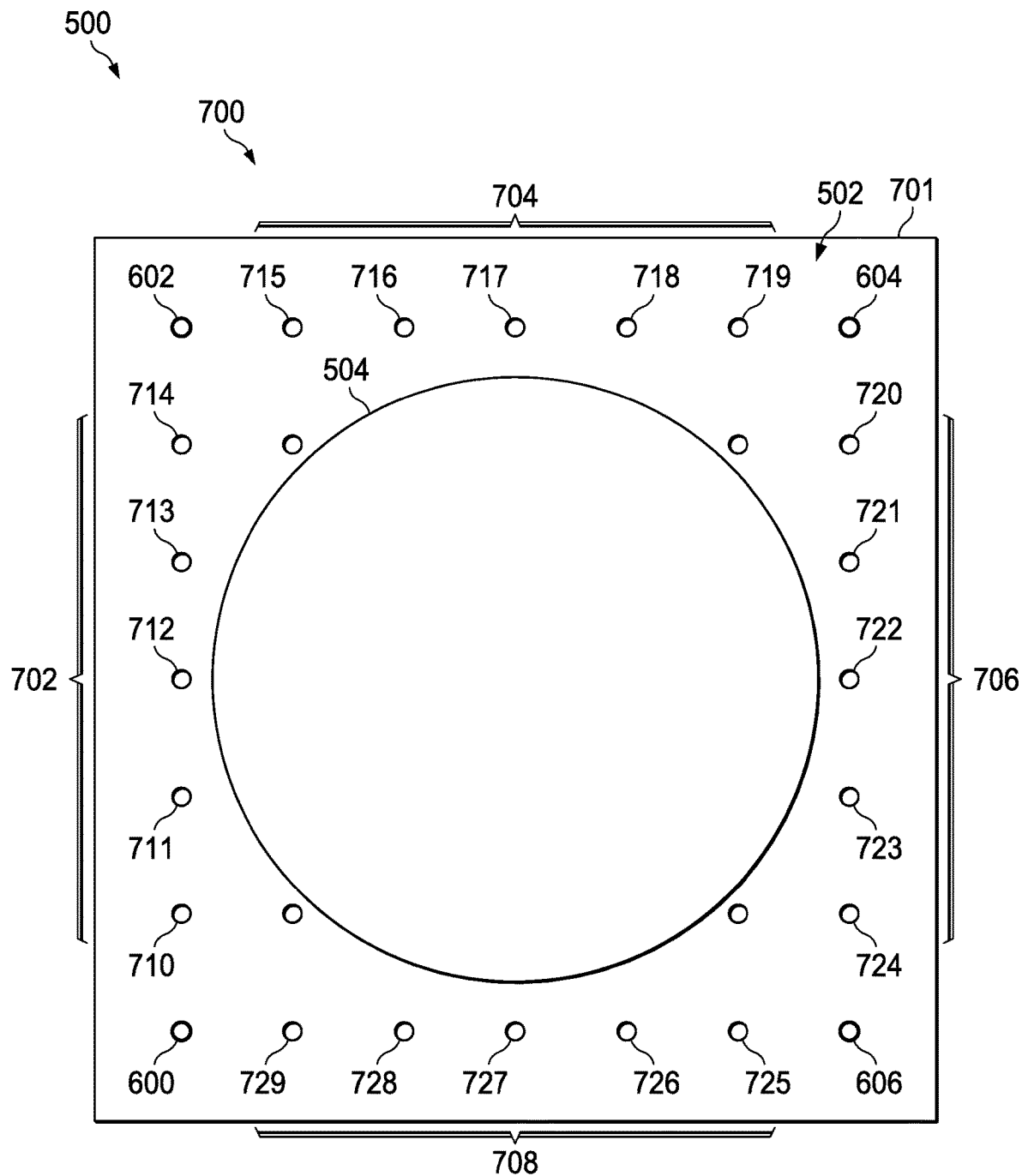
FIG. 7 is an illustration of a surface representation of an acoustic liner in accordance with an illustrative embodiment.

With reference now to FIG. 7, an illustration of a surface representation of an acoustic liner is depicted in accordance with an illustrative embodiment. In this example, surface representation 700 is generated from a scan of acoustic liner 500. In this example, corner hole 600, corner hole 602, corner hole 604, and corner hole 606 are seen in surface representation 700. Additionally, side locations are present for sides of rectangle 701 defined by the corner holes.

As depicted, first side of side locations 702 for rectangle 701 is between corner hole 600 and corner hole 602, and second side of side locations 704 is between corner hole 602 and corner hole 604. Third side of side locations 706 for rectangle 701 is between corner hole 604 and corner hole 606, and fourth side of side locations 708 for rectangle 701 is between corner hole 606 and corner hole 600. The side locations are equidistant to each other having a distance based on the distance between existing holes 502 in surface representation 700.

In this example, first side of side locations 702 includes side location 710, side location 711, side location 712, side location 713, and side location 714. Second side of side locations 704 includes side location 715, side location 716, side location 717, side location 718, and side location 719. Third side of side locations 706 includes side location 720, side location 721, side location 722, side location 723, and side location 724. As depicted, fourth side of side locations 708 includes side location 725, side location 726, side location 727, side location 728, and side location 729.

Figure 8:
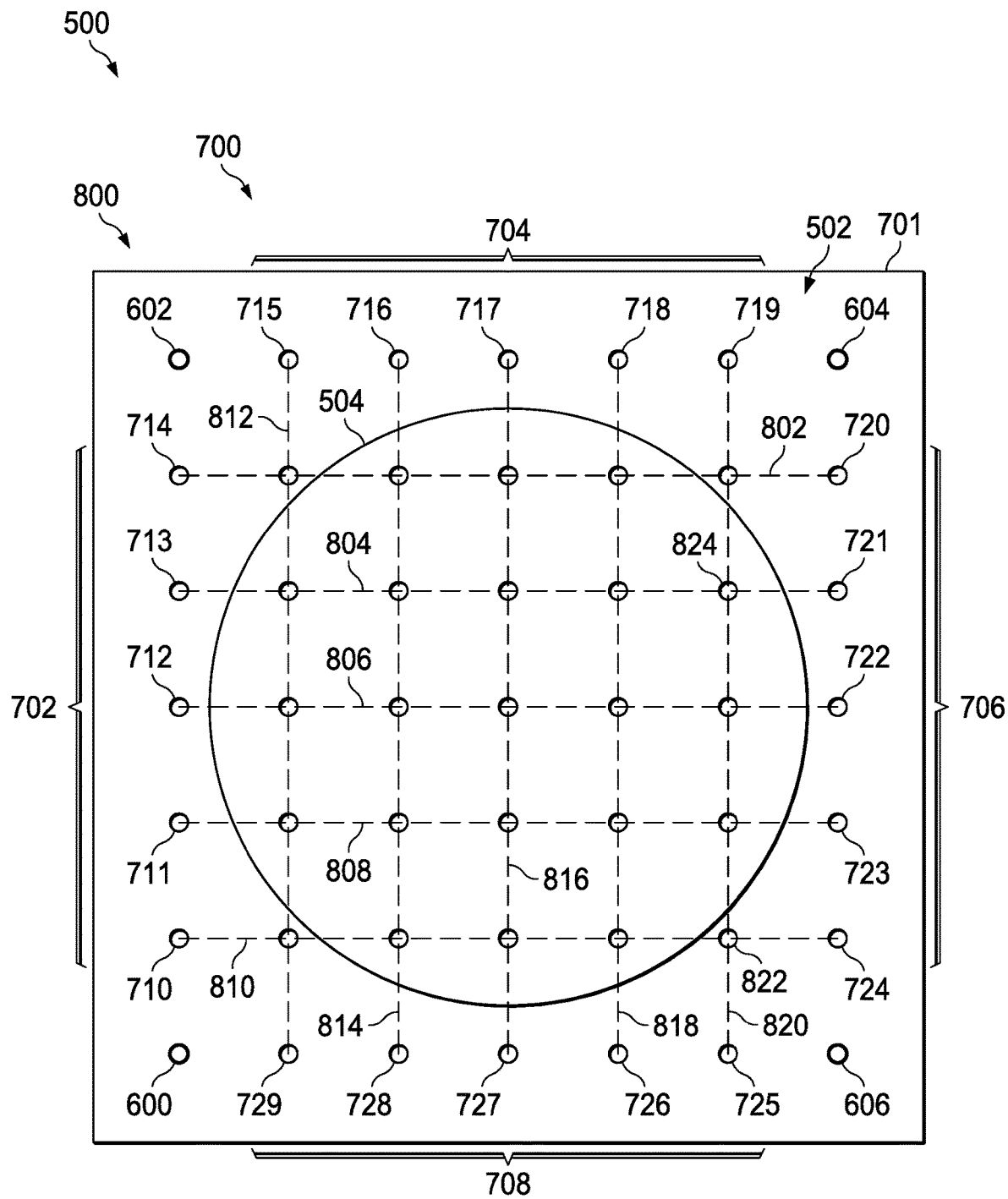
FIG. 8 is an illustration of a grid identifying intersection points for potential new holes in accordance with an illustrative embodiment.

With reference next to FIG. 8, an illustration of a grid identifying intersection points for potential new holes is depicted in accordance with an illustrative embodiment. In this illustrative example, grid 800 is a grid formed from the intersection of grid vector lines.

These grid vector lines follow a curvature of surface representation 700. The grid vector lines extend between side hole locations on opposing sides of a rectangle formed by the four corner holes.

The grid vector lines include grid vector line 802, grid vector line 804, grid vector line 806, grid vector line 808, and grid vector line 810 located between first side of side locations 702 and third side of side locations 706. The grid vector lines also include grid vector line 812, grid vector line 814, grid vector line 816, grid vector line 818, and grid vector line 820 located between second side of side locations 704 and fourth side of side locations 708. The intersection of these vectors form grid 800 at intersection points.

Point coordinates are identified for each of these intersection points in which existing holes are not present. For example, intersection point 822 is located at an existing hole and the identification of point coordinates for use in drilling the new holes is not required for this intersection point. As another example, intersection point 824 is located within repaired area 504 in which an existing hole was not present. As a result, the point coordinates for intersection point 824 is identified for use in drilling new holes.

In this manner, a model of new holes for acoustic liner 500 can be generated in surface representation 700 that matches the existing hole pattern for existing holes 502. The point coordinates can be used to identify an ordered sequence for drilling new holes in repaired area 504. This ordered sequence can then be used to identify a tool path for the drilling of new holes. One or more robotic control files can be created to control one or more robotic devices to drill the new holes using the tool path.

In this manner, acoustic properties for the portion of an inlet of an aircraft engine can be maintained. This process enables reworking a composite part rather than replacing the composite part, thus reducing the tedious and challenging process currently used to attempt to re-create a hole pattern to maintain acoustic properties.

The illustration of aircraft 300 and acoustic liner 500 for acoustic inner barrel 412 in inlet 330 for aircraft engine 310 in aircraft 300 in FIGS. 3-8 is only presented for purposes of providing one illustrative example of how a repair system can be used to rework a repaired area to match hole patterns. The examples in these figures are not meant to limit the manner in which other illustrative examples can be implemented. For example, the depiction of five number of side locations on each side is selected only for purposes of illustrating the different features and not representative of the number of side locations that can be present in actual implementation. For example, a side of rectangle may have 65, 87, 200, 350, or some other number of side locations depending on the size of the repaired area.

As another example, the acoustic liner can be used in other structures other than an aircraft. For example, the acoustic liner could be used in a ceiling or crown of an aircraft cabin or in the ceiling of a room in a building to provide desired acoustic properties. In other illustrative examples, the composite structure can take other forms other than an acoustic liner. In another illustrative example, the reworking can also be performed on flight surfaces for aircraft in which holes are present to inject air into. In this example, a reworked area of the flight surface can have holes drilled under the control of repair manager 118 in FIG. 1 such that the holes in the reworked area of the flight surface match the existing hole pattern for existing holes in the flight surface.

Figure 9:
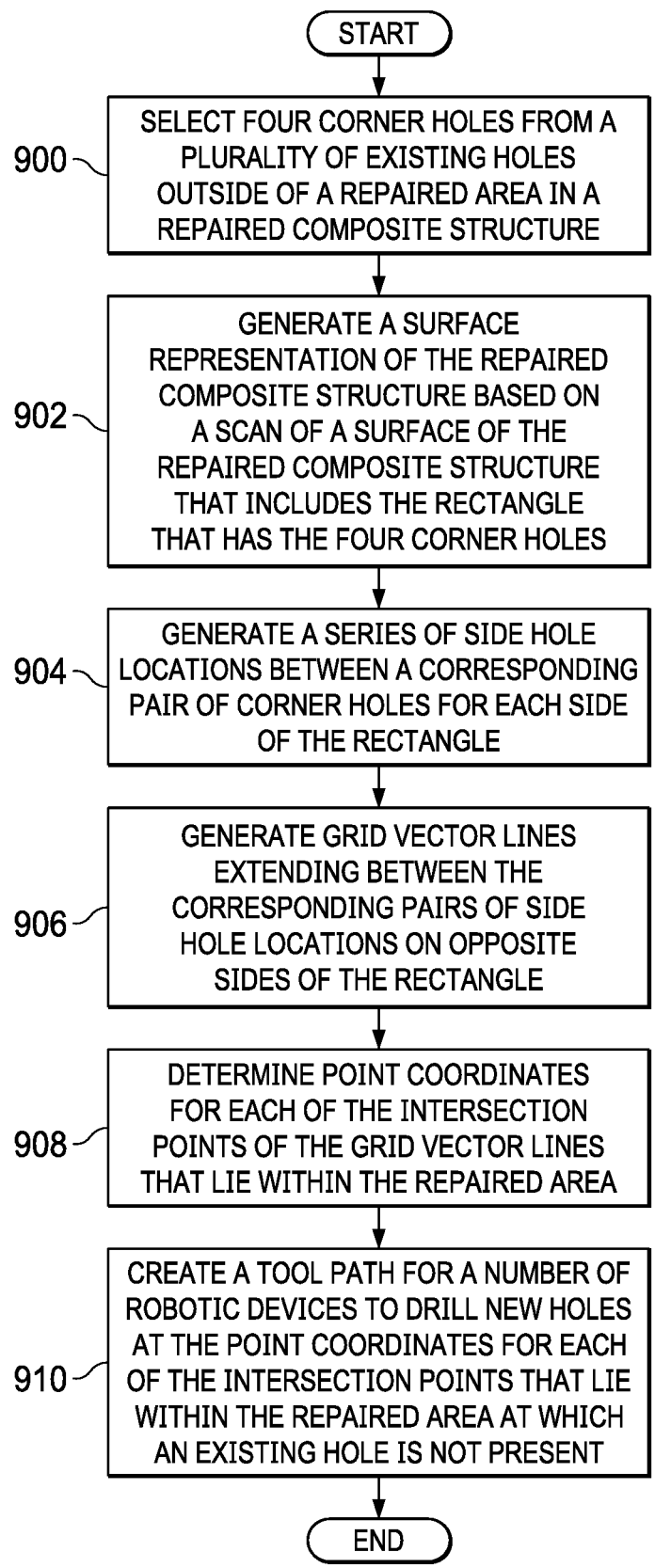
FIG. 9 is an illustration of a flowchart of a process for drilling holes in a repaired composite structure in accordance with an illustrative embodiment.

Turning next to FIG. 9, an illustration of a flowchart of a process for drilling holes in a repaired composite structure is depicted in accordance with an illustrative embodiment. The process in FIG. 9 can be implemented in hardware or software to enable drilling of holes in a composite structure that has been reworked. As depicted, the process can be implemented in a component such as repair manager 118 in computer system 122 in FIG. 1.

The process begins by selecting four corner holes from a plurality of existing holes outside of a repaired area in a repaired composite structure (operation 900). The four corner holes selected in operation 900 define a rectangle that encompasses the repaired area and at least a few rows of the plurality of existing holes outside of the repaired area. Each side on opposite sides of the rectangle includes a pair of corner holes with a same number of intermediate holes between the pair of corner holes. The selection of the four corner holes can be performed automatically by repair manager 118 in FIG. 1. For example, repair manager 118 in FIG. 1 can select the four corner holes as holes that form a rectangle that encompass the repaired area.

The process generates a surface representation of the repaired composite structure based on a scan of a surface of the repaired composite structure that includes a rectangle that has the four corner holes (operation 902). The scan is obtained from a three-dimensional scanner, such as a laser scanner. The scan may take the form of a point cloud or some other suitable type of scan depending on the particular implementation.

The process generates a series of side hole locations between a corresponding pair of corner holes for each side of the rectangle (operation 904). The side hole locations in the series are equidistant to each other. Further, the side hole locations may follow a vector between the pair of corner holes. The vector can follow a curve and the surface of the repaired composite structure in the surface representation of the repaired composite structure.

The process generates grid vector lines extending between the corresponding pairs of side hole locations on opposite sides of the rectangle (operation 906). In operation 906, the grid vector lines approximate a curvature of the surface of the repaired composite structure as represented in the surface representation of the repaired composite structure. Additionally, the grid vector lines intersect each other at intersection points on the surface representation to form a grid.

The process determines point coordinates for each intersection point of the grid vector lines that lie within the repaired area (operation 908). The process creates a tool path for a number of robotic devices to drill new holes at the point coordinates for each of the intersection points that lie within the repaired area at which an existing hole is not present (operation 910). The process terminates thereafter. This process can be an automated process that does not require input from a human operator.

The process illustrated in the flowchart in FIG. 9 enables the number of robotic devices to drill new holes in the repaired area with a hole pattern that substantially matches an existing hole pattern for the plurality of existing holes in the repaired composite structure. One or more robotic control files can be created for use by one or more robotic devices to perform the drilling operations to drill the new holes within the repaired area such that the new holes have a hole pattern that matches the existing hole pattern for the existing holes as closely as desired.

The match between the hole pattern for the new holes and the existing hole pattern for the existing holes is selected to be close enough such that the desired properties for the repaired composite structure is maintained. For example, if the repaired composite structure is an acoustic structure, such as a panel or a barrel within an inlet of an aircraft engine, the new holes drilled may be drilled in a manner such that the pattern of the new holes substantially matches the existing pattern for the existing holes closely enough to provide desired acoustic properties for the repaired panel or barrel for the inlet. In other words, the match is a substantial match and does not have to be an exact match, but close enough to provide the desired properties for the repaired composite structure.

Figure 10:
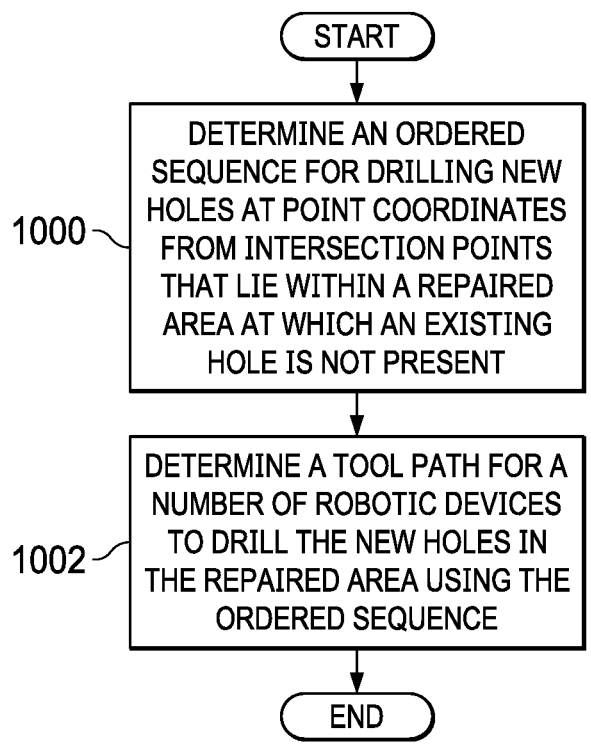
FIG. 10 is an illustration of a flowchart of a process for creating a number of robotic files for a tool path in accordance with an illustrative embodiment.

With reference now to FIG. 10, an illustration of a flowchart of a process for creating a number of robotic files for a tool path is depicted in accordance with an illustrative embodiment. The process in FIG. 10 can be implemented in hardware or software to generate robotic control files for use by robotic devices to drill holes in a composite structure that has been reworked. As depicted, the process can be implemented in a component such as repair manager 118 in computer system 122 in FIG. 1 and FIG. 2.

The process begins by determining an ordered sequence for drilling new holes at point coordinates from intersection points that lie within a repaired area at which an existing hole is not present (operation 1000). The ordered sequence can result in the shortest distance of travel for the tool path. In other illustrative examples, the ordered sequence can also take into account other factors such as positioning stations for robotic devices, tool changes, or other suitable factors.

The process determines a tool path for a number of robotic devices to drill the new holes in the repaired area using the ordered sequence (operation 1002). The process terminates thereafter.

Figure 11:
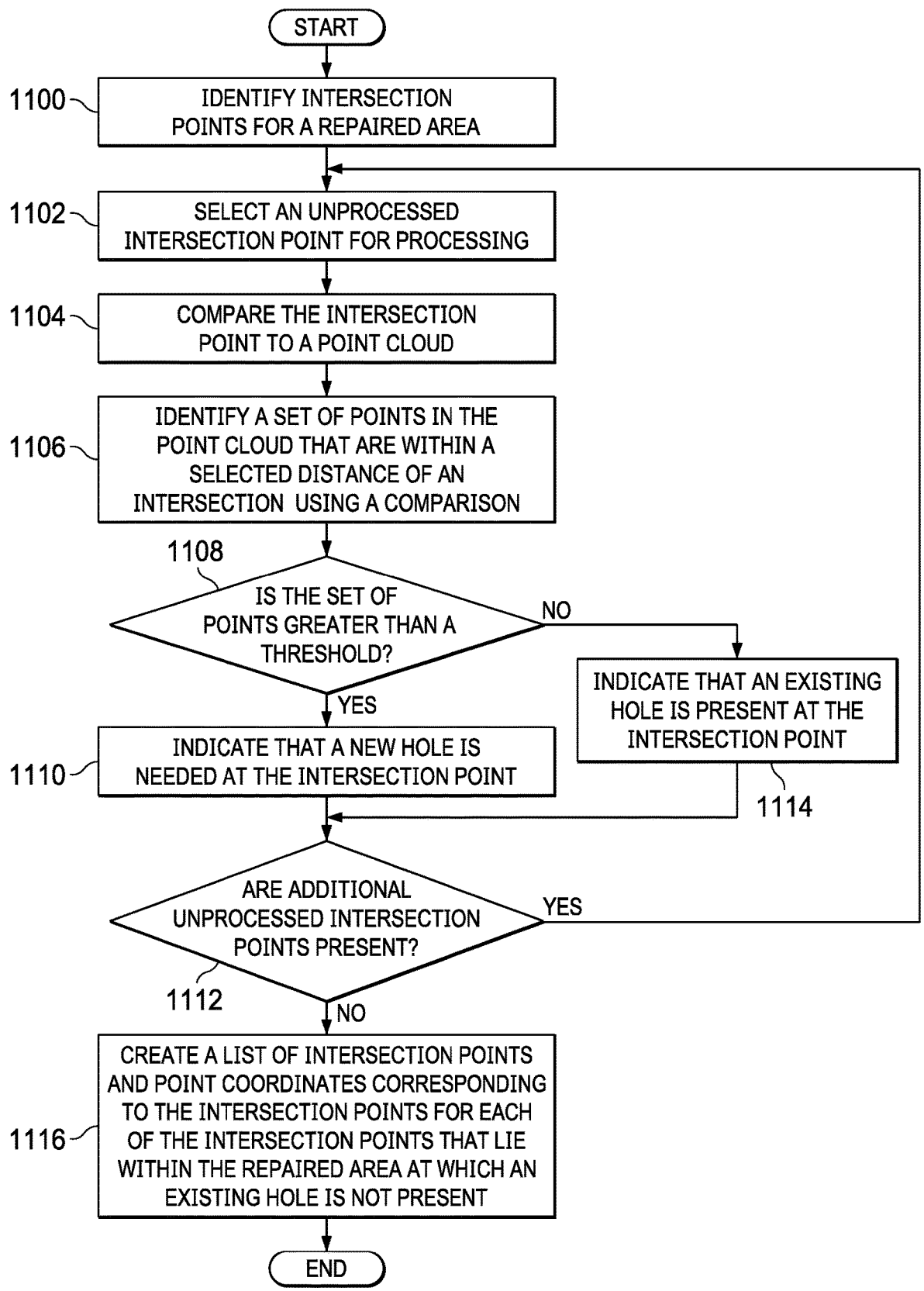
FIG. 11 is an illustration of a flowchart of a process for determining whether a new hole is needed at an intersection point in accordance with an illustrative embodiment.

With reference next to FIG. 11, an illustration of a flowchart of a process for determining whether a new hole is needed at an intersection point is depicted in accordance with an illustrative embodiment. The process illustrated in FIG. 11 can be implemented to identify where an existing hole is not present when creating a tool path in operation 910 in FIG. 9. The process in FIG. 11 can be implemented in hardware or software. As depicted, the process can be implemented in a component such as repair manager 118 in computer system 122 in FIG. 1. In this illustrative example, a scan of a surface of a repaired composite structure is a point cloud. This process compares an intersection point to one or more points in the point cloud to determine whether existing holes are present.

The process begins by identifying intersection points for a repaired area (operation 1100). The process selects an unprocessed intersection point for processing (operation 1102). The process compares the intersection point to a point cloud (operation 1104). In operation 1104, the comparison of the intersection point to points in the point cloud can be performed in a number of different ways. For example, the intersection points in the surface representation can have the same coordinate system as the points in the point cloud from which the surface representation was generated. For example, the surface representation containing the intersection point can have coordinates for a coordinate system with the same origin as the point cloud. For example, the origin for both the surface representation and the point cloud can be on or in a location relative to repaired composite structure 102 in FIG. 1.

The process identifies a set of points in the point cloud that are within a selected distance of an intersection using a comparison (operation 1106). As used herein, "a set of," when used with to reference items, means zero or more items. For example, "a set of points" can be zero or more points. In other words, the set of points can be an empty or null set in this illustrative example. In this example, the selected distance is based on the hole size and also point density (point spacing) of the point cloud, which is determined by scanner capability and chosen settings.

A determination is made as to whether the set of points is greater than a threshold (operation 1108). In operation 1108, a determination is made as to whether a hole exists at the intersection point. One manner in which this determination can be made includes comparing the density of points at that intersection point to a threshold. If the surface is solid at the intersection point, the point density will be greater than if a hole exists at the intersection point. In this illustrative example, more points are present when a surface is present rather than a hole. The threshold is selected as the number of points that indicates that an existing hole is not present. The threshold value can be selected based on the hole size and the resolution of the scanner.

If the set of points is greater than the threshold, the process indicates that a new hole is needed at the intersection point (operation 1110). A determination is then made as to whether additional unprocessed intersection points are present (operation 1112). If additional unprocessed intersection points are present, the process returns to operation 1102. Otherwise, the process creates a list of intersection points and point coordinates corresponding to the intersection points for each of the intersection points that lie within the repaired area at which an existing hole is not present (operation 1116). The process terminates thereafter. In this manner, the list of intersection points and the point coordinates corresponding to the intersection points in operation 1112 can be used to generate a list of new holes that should be drilled in the repaired area at the intersection points that have been marked with indications that a new hole is needed. In operation 1116, this list can be used by repair manager 118 in FIG. 1 to automatically create a tool path to drill the new holes for the point coordinates at intersection points that lie within the repaired area in which existing holes are not present.

With reference again to operation 1108, if the set of points is not greater than the threshold, the process indicates that an existing hole is present at the intersection point (operation 1114). The process then proceeds to operation 1112.

Figure 12:
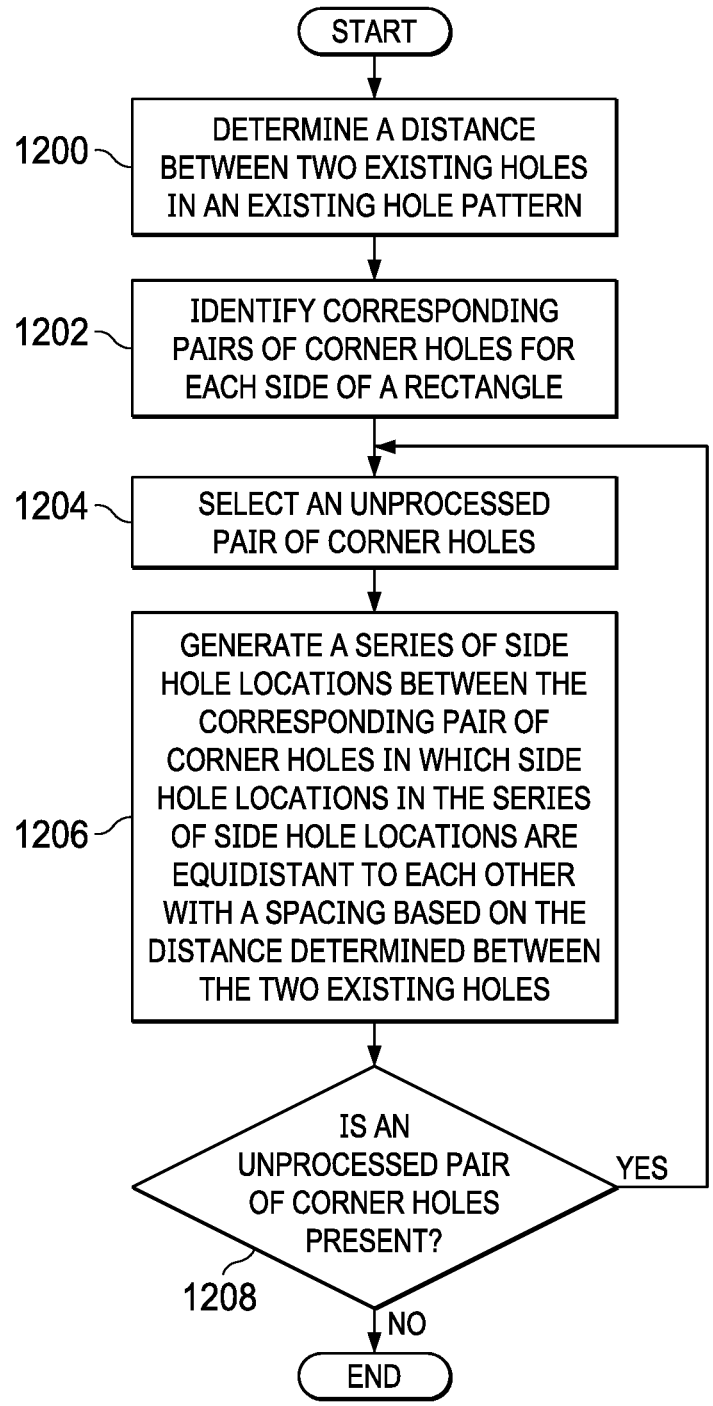
FIG. 12 is an illustration of a flowchart of a process for generating side hole locations in accordance with an illustrative embodiment.

With reference to FIG. 12, an illustration of a flowchart of a process for generating side hole locations is depicted in accordance with an illustrative embodiment. The process in this flowchart is an example of one manner in which operation 904 in FIG. 9 can be implemented.

The process begins by determining a distance between two existing holes in an existing hole pattern (operation 1200). The process identifies corresponding pairs of corner holes for each side of a rectangle (operation 1202). The process selects an unprocessed pair of corner holes (operation 1204). The process generates a series of side hole locations between the corresponding pair of corner holes in which side hole locations in the series of side hole locations are equidistant to each other with a spacing based on the distance determined between the two existing holes (operation 1206).

A determination is made as to whether an unprocessed pair of corner holes is present (operation 1208). If an unprocessed pair of corner holes is present, the process returns to operation 1204. Otherwise, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of program code and hardware.

When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 13:
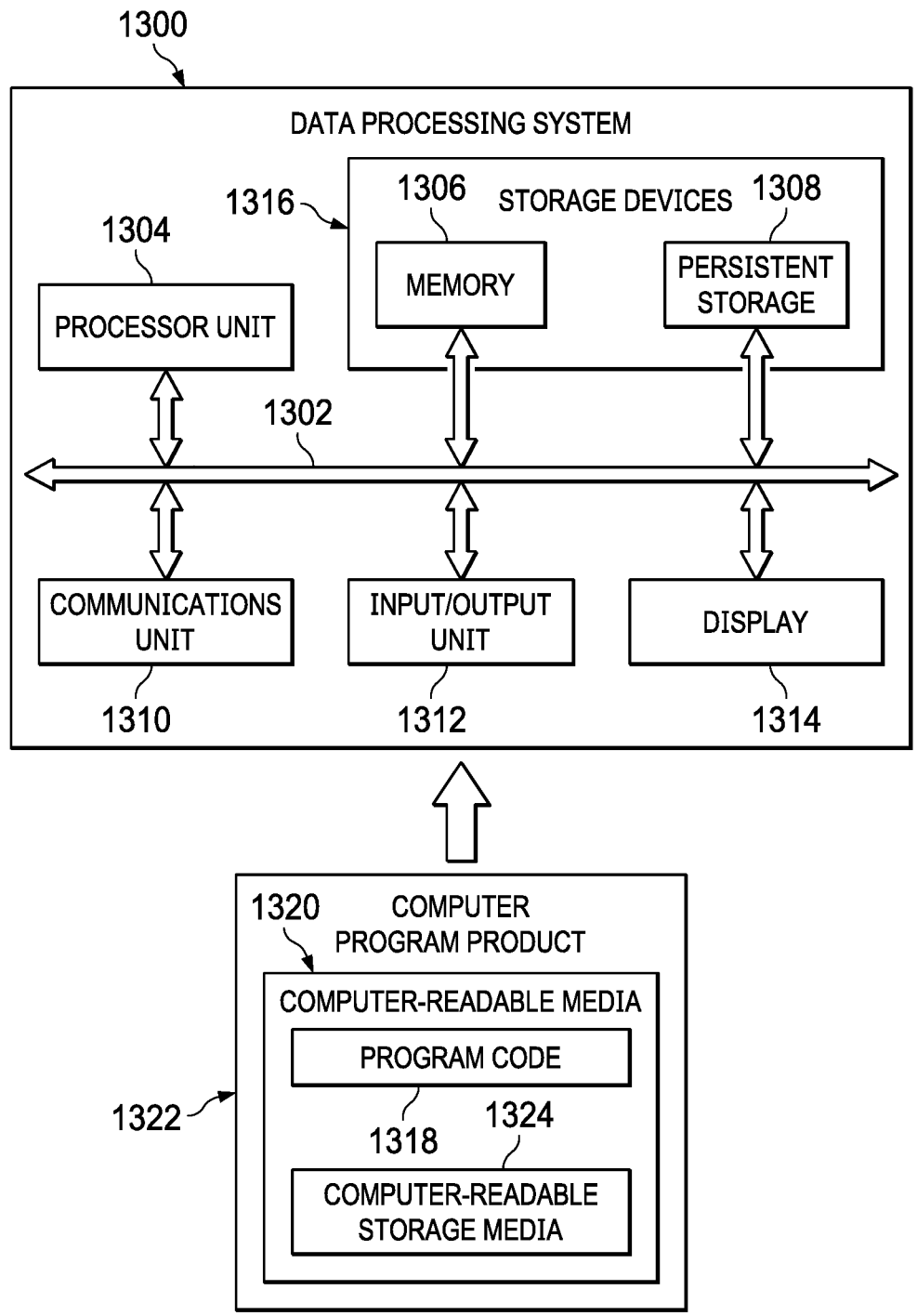
FIG. 13 is an illustration of a block diagram of a data processing system in accordance with an illustrative embodiment.

Turning now to FIG. 13, an illustration of a block diagram of a data processing system is depicted in accordance with an illustrative embodiment. Data processing system 1300 may be used to implement computer system 122 in FIG. 1. In this illustrative example, data processing system 1300 includes communications framework 1302, which provides communications between processor unit 1304, memory 1306, persistent storage 1308, communications unit 1310, input/output unit 1312, and display 1314. In this example, communications framework 1302 may take the form of a bus system.

Processor unit 1304 serves to execute instructions for software that may be loaded into memory 1306. Processor unit 1304 may be a number of processors, a multi-processor core, or some other type of processor, depending on the particular implementation.

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer-readable storage devices in these illustrative examples. Memory 1306, in these examples, may be, for example, a random-access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a solid-state drive (SSD), a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that may be connected to data processing system 1300. For example, input/output unit 1312 may provide a connection for user input through at least one of a keyboard, a mouse, or some other suitable input device.

Further, input/output unit 1312 may send output to a printer. Display 1314 provides a mechanism to display information to a user.

Instructions for at least one of the operating system, applications, or programs may be located in storage devices 1316, which are in communication with processor unit 1304 through communications framework 1302. The processes of the different embodiments may be performed by processor unit 1304 using computer-implemented instructions, which may be located in a memory, such as memory 1306.

These instructions are referred to as program code, computer usable program code, or computer-readable program code that may be read and executed by a processor in processor unit 1304. The program code in the different embodiments may be embodied on different physical or computer-readable storage media, such as memory 1306 or persistent storage 1308.

Program code 1318 is located in a functional form on computer-readable media 1320 that is selectively removable and may be loaded onto or transferred to data processing system 1300 for execution by processor unit 1304. Program code 1318 and computer-readable media 1320 form computer program product 1322 in these illustrative examples. In the illustrative example, computer-readable media 1320 is computer-readable storage media 1324.

In these illustrative examples, computer-readable storage media 1324 is a physical or tangible storage device used to store program code 1318 rather than a medium that propagates or transmits program code 1318.

Alternatively, program code 1318 may be transferred to data processing system 1300 using a computer-readable signal media. The computer-readable signal media may be, for example, a propagated data signal containing program code 1318. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1300 are not meant to provide architectural limitations to the manner in which different embodiments may be implemented. The different illustrative embodiments may be implemented in a data processing system including components in addition to or in place of those illustrated for data processing system 1300. Other components shown in FIG. 13 can be varied from the illustrative examples shown. The different embodiments may be implemented using any hardware device or system capable of running program code 1318.

Figure 14:
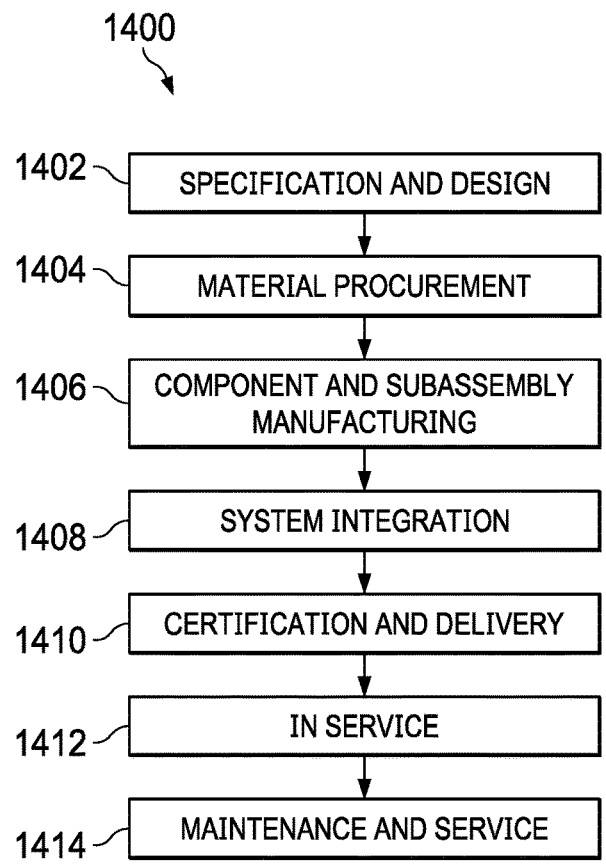
FIG. 14 is an illustration of a block diagram of an aircraft manufacturing and service method in accordance with an illustrative embodiment.
Figure 15:
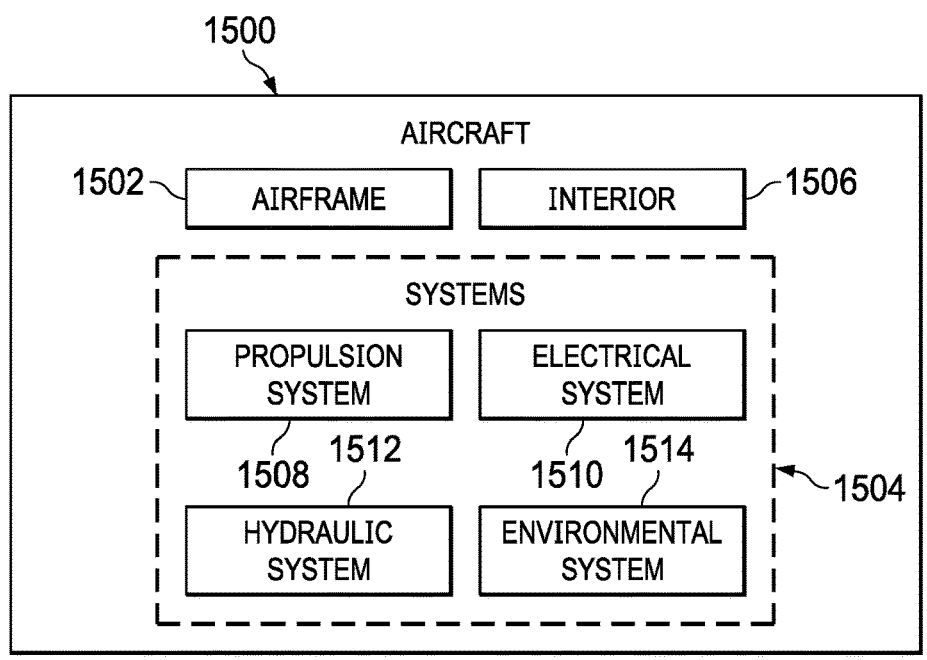
FIG. 15 is an illustration of a block diagram of an aircraft in accordance with an illustrative embodiment.

Illustrative embodiments of the disclosure may be described in the context of aircraft manufacturing and service method 1400 as shown in FIG. 14 and aircraft 1500 as shown in FIG. 15. Turning first to FIG. 14, an illustration of a block diagram of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of a block diagram of an aircraft is depicted in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14. For example, composite structure repair system 106 in FIG. 1 can be used during different stages of manufacturing and service method 1400 in FIG. 14.

In one illustrative example, components or subassemblies produced in component and subassembly manufacturing 1406 in FIG. 14 may be fabricated or manufactured in a manner similar to components or subassemblies produced while aircraft 1500 is in service 1412. As yet another example, one or more apparatus embodiments, method embodiments, or a combination thereof may be utilized during production stages, such as component and subassembly manufacturing 1406 and system integration 1408. Composite structure repair system 106 in FIG. 1 can be used to drill holes in repaired composite structures that may be reworked during any one of the stages.

One or more apparatus embodiments, method embodiments, or a combination thereof may be utilized while aircraft 1500 is in service 1412, during maintenance and service 1414 in FIG. 14, or both. For example, composite structure repair system 106 in FIG. 1 can be utilized during maintenance and service 1414 in FIG. 14 to rework composite structures such that a hole pattern any reworked area matches existing hole patterns in the composite structure being reworked. This type of drilling of holes can be performed for reworking composite structures during modification, reconfiguration, refurbishment, and other maintenance or service that occurred during maintenance and service 1414 in FIG. 14.

The use of a number of the different illustrative embodiments may substantially expedite the assembly of aircraft 1500, reduce the cost of aircraft 1500, or both expedite the assembly of aircraft 1500 and reduce the cost of aircraft 1500.

Figure 16:
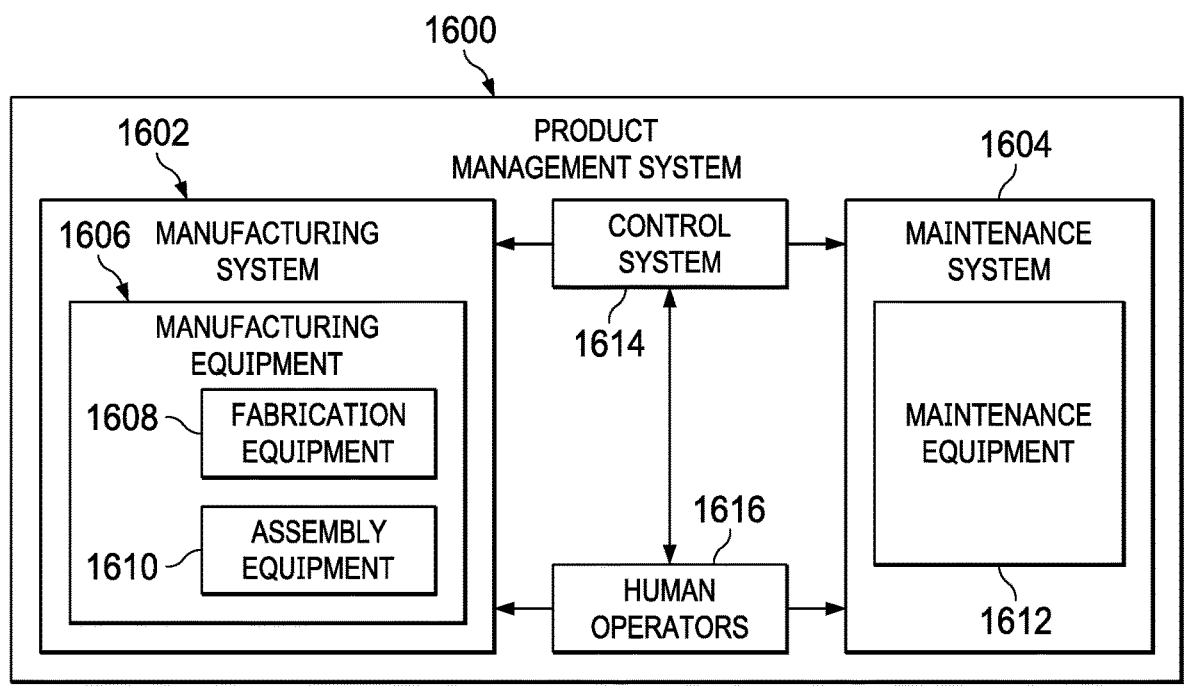
FIG. 16 is an illustration of a block diagram of a product management system in accordance with an illustrative embodiment.

Turning now to FIG. 16, an illustration of a block diagram of a product management system is depicted in accordance with an illustrative embodiment. Product management system 1600 is a physical hardware system. In this illustrative example, product management system 1600 may include at least one of manufacturing system 1602 or maintenance system 1604.

Manufacturing system 1602 is configured to manufacture products, such as aircraft 1500 in FIG. 15. As depicted, manufacturing system 1602 includes manufacturing equipment 1606. Manufacturing equipment 1606 includes at least one of fabrication equipment 1608 or assembly equipment 1610.

Fabrication equipment 1608 is equipment that may be used to fabricate components for parts used to form aircraft 1500 in FIG. 15. For example, fabrication equipment 1608 may include machines and tools. These machines and tools may be at least one of a drill, a hydraulic press, a furnace, a mold, a composite tape laying machine, a vacuum system, a lathe, or other suitable types of equipment. Fabrication equipment 1608 may be used to fabricate at least one of metal parts, composite parts, semiconductors, circuits, fasteners, ribs, skin panels, spars, antennas, or other suitable types of parts.

Assembly equipment 1610 is equipment used to assemble parts to form aircraft 1500 in FIG. 15. In particular, assembly equipment 1610 may be used to assemble components and parts to form aircraft 1500 in FIG. 15. Assembly equipment 1610 also may include machines and tools. These machines and tools may be at least one of a robotic arm, a crawler, a faster installation system, a rail-based drilling system, or a robot. Assembly equipment 1610 may be used to assemble parts such as seats, horizontal stabilizers, wings, engines, engine housings, landing gear systems, and other parts for aircraft 1500 in FIG. 15.

In this illustrative example, maintenance system 1604 includes maintenance equipment 1612. Maintenance equipment 1612 may include any equipment needed to perform maintenance on aircraft 1500 in FIG. 15. Maintenance equipment 1612 may include tools for performing different operations on parts on aircraft 1500 in FIG. 15. These operations may include at least one of disassembling parts, refurbishing parts, inspecting parts, reworking parts, manufacturing replacement parts, or other operations for performing maintenance on aircraft 1500 in FIG. 15. These operations may be for routine maintenance, inspections, upgrades, refurbishment, or other types of maintenance operations.

In the illustrative example, maintenance equipment 1612 may include ultrasonic inspection devices, x-ray imaging systems, vision systems, drills, crawlers, and other suitable device. In some cases, maintenance equipment 1612 may include fabrication equipment 1608, assembly equipment 1610, or both to produce and assemble parts that may be needed for maintenance.

Product management system 1600 also includes control system 1614. Control system 1614 is a hardware system and may also include software or other types of components. Control system 1614 is configured to control the operation of at least one of manufacturing system 1602 or maintenance system 1604. In particular, control system 1614 may control the operation of at least one of fabrication equipment 1608, assembly equipment 1610, or maintenance equipment 1612.

The hardware in control system 1614 may be using hardware that may include computers, circuits, networks, and other types of equipment. The control may take the form of direct control of manufacturing equipment 1606. For example, robots, computer-controlled machines, and other equipment may be controlled by control system 1614. In other illustrative examples, control system 1614 may manage operations performed by human operators 1616 in manufacturing or performing maintenance on aircraft 1500 in FIG. 15. For example, control system 1614 may assign tasks, provide instructions, display models, or perform other operations to manage operations performed by human operators 1616.

In these illustrative examples, repair manager 118 in computer system 122 in FIG. 1 may be implemented in control system 1614 to manage at least one of the manufacturing or maintenance of aircraft 1500 in FIG. 15. For example, repair manager 118 in FIG. 1 can manage drilling operations performed as part of reworking parts, such as composite structures, that may be used in manufacturing or maintenance of aircraft 1500 in FIG. 15. The drilling operations performed enable drilling holes with a hole pattern that matches the existing hole pattern of the holes outside of a repaired area for a composite structure, such as a barrel of an aircraft inlet.

In the different illustrative examples, human operators 1616 may operate or interact with at least one of manufacturing equipment 1606, maintenance equipment 1612, or control system 1614. This interaction may be performed to manufacture aircraft 1500 in FIG. 15.

Of course, product management system 1600 may be configured to manage other products other than aircraft 1500 in FIG. 15. Although product management system 1600 has been described with respect to manufacturing in the aerospace industry, product management system 1600 may be configured to manage products for other industries. For example, product management system 1600 can be configured to manufacture products for the automotive industry as well as any other suitable industries.

The illustrative examples provide a method, an apparatus, and a system for reworking composite structures. A composite structure repair system implemented in accordance with an illustrative example enables a more efficient performance of drilling operations in a repaired area for a repaired composite structure. One or more of the illustrative examples provide a technical solution that enables automating the identification of new holes in a repaired area with a pattern that matches the existing pattern for existing holes in the prepared composite structure.

For example, a composite structure repair system with repair manager 118 in FIG. 1 enables reworking of composite structures, such as an inner barrel of an inlet in an aircraft engine, in less time and effort, thus making rework possible in place of replacing composite structures. As a result, replacing the barrel in the inlet may be avoided, reducing the cost of maintaining the aircraft.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for drilling holes in a repaired composite structure, the method comprising:
   selecting four corner holes from a plurality of existing holes outside of a repaired area in the repaired composite structure, wherein the four corner holes define a rectangle that encompasses the repaired area and at least a few rows of the plurality of existing holes outside of the repaired area, and wherein each side on opposite sides of the rectangle includes a pair of corner holes with a same number of intermediate holes between the pair of corner holes;
   generating a surface representation of the repaired composite structure based on a scan of a surface of the repaired composite structure that includes the rectangle that has the four corner holes, wherein the scan is obtained from a three-dimensional scanner;
   generating, for each side of the rectangle, a series of side hole locations between a corresponding pair of corner holes, wherein side hole locations in the series of side hole locations are equidistant to each other;
   generating grid vector lines extending between corresponding pairs of the side hole locations on the opposite sides of the rectangle, wherein the grid vector lines approximate a curvature of the surface of the repaired composite structure and intersect each other at intersection points on the surface representation to form a grid;
   determining point coordinates for each of the intersection points of the grid vector lines that lie within the repaired area; and
   creating a tool path for a number of robotic devices to drill new holes at the point coordinates for each of the intersection points that lie within the repaired area at which an existing hole is not present, enabling the number of robotic devices to drill the new holes in the repaired area with a hole pattern that matches an existing hole pattern for the plurality of existing holes in the repaired composite structure.

2. The method of claim 1, wherein creating the tool path for the number of robotic devices to drill the new holes at the point coordinates for each of the intersection points that lie within the repaired area at which the existing hole is not present comprises:
   determining an ordered sequence for drilling the new holes at the point coordinates from the intersection points that lie within the repaired area at which the existing hole is not present; and
   determining the tool path for the number of robotic devices to drill the new holes in the repaired area using the ordered sequence.

3. The method of claim 1 further comprising:
   creating a number of robotic control files.

4. The method of claim 3 further comprising:
   drilling the new holes using the number of robotic devices with the number of robotic control files, wherein a robotic device in the number of robotic devices performs drilling operations on a portion of the tool path assigned to the robotic device in a robotic control file in the number of robotic control files for the robotic device.

5. The method of claim 1, wherein the scan of the surface of the repaired composite structure is a point cloud and further comprising:
   comparing an intersection point to points in the point cloud;
   indicating that a new hole is needed at the intersection point if the points in the point cloud within a selected distance of the intersection point are greater than a threshold; and
   creating a list of the intersection points and the point coordinates corresponding to the intersection points for each of the intersection points that lie within the repaired area at which the existing hole is not present, wherein the list is used to create the tool path.

6. The method of claim 5 further comprising:
   indicating that the existing hole is present at the intersection point if the points in the point cloud within the selected distance of the intersection point do not exceed the threshold.

7. The method of claim 1, wherein the series of side hole locations are spaced apart from each other with a first distance that is substantially equal to a second distance between two adjacent existing holes for the existing hole pattern in the repaired composite structure.

8. The method of claim 1 further comprising:
   determining a distance between two existing holes in the existing hole pattern, wherein generating, for each side of the rectangle, the series of side hole locations between the corresponding pair of corner holes, wherein the side hole locations in the series are equidistant to each other comprises:
      generating, for each side of the rectangle, the series of side hole locations between the corresponding pair of corner holes, wherein the side hole locations in the series of side hole locations are equidistant to each other with a spacing based on the distance determined between the two existing holes.

9. The method of claim 1, wherein the repaired composite structure is selected from a group comprising an aircraft engine inlet, a composite sandwich, and an acoustic composite structure.

10. The method of claim 1, wherein the repaired composite structure for a platform is selected from one of a mobile platform, a stationary platform, a land-based structure, an aquatic-based structure, a space-based structure, an aircraft, a commercial aircraft, a rotorcraft, a surface ship, a tank, a personnel carrier, a train, a spacecraft, a space station, a satellite, a submarine, an automobile, a power plant, a bridge, a dam, a house, a manufacturing facility, and a building.

11. A composite structure repair system comprising:
   a computer system; and
   a repair manager running on the computer system, wherein the repair manager selects four corner holes from a plurality of existing holes outside of a repaired area in a repaired composite structure, wherein the four corner holes define a rectangle that encompasses the repaired area and at least a few rows of the plurality of existing holes outside of the repaired area, and wherein each side on opposite sides of the rectangle includes a pair of corner holes with a same number of intermediate holes between the pair of corner holes; generates a surface representation of the repaired composite structure based on a scan of a surface of the repaired composite structure that includes the rectangle that has the four corner holes, wherein the scan is obtained from a three-dimensional scanner; generates, for each side of the rectangle, a series of side hole locations between a corresponding pair of corner holes, wherein side hole locations in the series of side hole locations are equidistant to each other; generates grid vector lines extending between corresponding pairs of the side hole locations on opposite sides of the rectangle, wherein the grid vector lines approximate a curvature of the surface of the repaired composite structure and intersect each other at intersection points on the surface representation to form a grid; determines point coordinates for each of the intersection points of the grid vector lines that lie within the repaired area; and creates a tool path for a number of robotic devices to drill new holes at the point coordinates for each of the intersection points that lie within the repaired area at which an existing hole is not present, enabling the number of robotic devices to drill the new holes in the repaired area with a hole pattern that matches an existing hole pattern for the plurality of existing holes in the repaired composite structure.

12. The composite structure repair system of claim 11, wherein in creating the tool path for the number of robotic devices to drill the new holes at the point coordinates for each of the intersection points that lie within the repaired area at which the existing hole is not present, the repair manager determines an ordered sequence for drilling the new holes at the point coordinates from the intersection points that lie within the repaired area at which the existing hole is not present; and determines the tool path for the number of robotic devices to drill the new holes in the repaired area using the ordered sequence.

13. The composite structure repair system of claim 11, wherein the repair manager creates a number of robotic control files.

14. The composite structure repair system of claim 13, wherein the number of robotic devices drill the new holes using the number of robotic control files, wherein a robotic device in the number of robotic devices performs drilling operations on a portion of the tool path assigned to the robotic device in a robotic control file in the number of robotic control files for the robotic device.

15. The composite structure repair system of claim 11, wherein the scan of the surface of the repaired composite structure is a point cloud, wherein the repair manager compares an intersection point to points in the point cloud; indicates that a new hole is needed at the intersection point if the points in the point cloud within a selected distance of the intersection point are greater than a threshold; and creates a list of the intersection points and the point coordinates corresponding to the intersection points for each of the intersection points that lie within the repaired area at which the existing hole is not present, wherein the list of the intersection points is used to create the tool path.

16. The composite structure repair system of claim 15, wherein the repair manager indicates that the existing hole is present at the intersection point if the points in the point cloud within the selected distance of the intersection point do not exceed the threshold.

17. The composite structure repair system of claim 11, wherein the series of side hole locations are spaced apart from each other with a first distance that is substantially equal to a second distance between two adjacent existing holes for the existing hole pattern in the repaired composite structure.

18. The composite structure repair system of claim 11, wherein the repair manager determines a distance between two existing holes in the existing hole pattern, wherein in generating, for each side of the rectangle, the series of side hole locations between the corresponding pair of corner holes, wherein the side hole locations in the series of side hole locations are equidistant to each other, the repair manager generates, for each side of the rectangle, the series of side hole locations between the corresponding pair of corner holes, wherein the side hole locations in the series of side hole locations are equidistant to each other with a spacing based on the distance determined between the two existing holes.

19. The composite structure repair system of claim 11, wherein the repaired composite structure is selected from a group comprising an aircraft engine inlet, a composite sandwich, and an acoustic composite structure.

20. The composite structure repair system of claim 11, wherein the repaired composite structure for a platform is selected from one of a mobile platform, a stationary platform, a land-based structure, an aquatic-based structure, a space-based structure, an aircraft, a commercial aircraft, a rotorcraft, a surface ship, a tank, a personnel carrier, a train, a spacecraft, a space station, a satellite, a submarine, an automobile, a power plant, a bridge, a dam, a house, a manufacturing facility, and a building.

* * * * *